Patented Mar. 19, 1946

2,396,677

UNITED STATES PATENT OFFICE 2,396,677

PROCESS FOR POLYMERIZING OLEFINIC MATERIALS

Merlin Martin Brubaker, Wilmington, Del., assignor to E. I. du Pont de Nemours & Company, Wilmington, Del., a corporation of Delaware No Drawing. Application March 15, 1941, Serial No. 383,556

8 Claims. (Cl. 260—94)

This invention relates to polymerization processes and more particularly to polymerizations involving ethylene, either alone or together with other polymerizable materials.

Various proposals have been made for polymerizing ethylene either singly or mixed with other polymerizable substances, the principal objective of which has been the production of high molecular weight polymers of high tensile strength.

Processes for polymerizing liquid organic compounds in the presence of water, dispersing agents and catalysts are known. It has been unexpectedly discovered that ethylene can advantageously be polymerized in the presence of water and a catalyst and without the use of a dispersing agent. In fact, if the dispersing agent is omitted polymers are produced having high intrinsic viscosities and which are suitable for the preparation of films. The omission of the dispersing agent has the further advantage in that it avoids the necessity of having to remove the dispersing agent from the resulting polymer, in some instances a very difficult operation.

It is accordingly an object of this invention to provide a method for polymerizing ethylene alone and in admixture with other polymerizable organic compounds to produce polymers of high intrinsic viscosity. It is another object to provide a process for polymerizing ethylene alone and in admixture with other polymerizable organic compounds which is free of the disadvantages inherent to prior art methods and which is adaptable to large-scale operation.

The above and other objects appearing hereinafter are accomplished by subjecting ethylene alone or admixed with other polymerizable organic compounds to polymerizing conditions in the presence of an aqueous medium and a polymerization catalyst.

According to this invention, ethylene alone, or in admixture with at least one other polymerizable organic compound may be polymerized, in a manner which presents advantages over the prior art, by subjection, in the presence of a polymerization catalyst but in the absence of dispersing agents, to elevated temperatures and pressures in the presence of water.

In practicing this invention it is generally preferred to use water alone as the menstruum as this operates to give polymers of higher intrinsic viscosity than are otherwise obtained and it avoids the need for solvent recovery, an otherwise necessary step for economic operation. If desired, however, part of the water can be replaced by an organic compound, preferably a volatile liquid organic compound such as isooctane, toluene, normal hexane, cyclohexane, meta-bromtoluene, petroleum ether, and the like.

The range of temperatures within which this invention may be practiced is wide, temperatures of from 20° C. to 350° C. covering the desired field, that is it is preferable to maintain the temperature at a point below the critical temperature of water and above the temperature at which ethylene hydrates form. Within this range the preferred field of operation is from about 50 to 250° C., although 60 to 150° is conducive to best results. In making polymers of ethylene with other polymerizable materials, the particular temperatures used are influenced by the polymerizing characteristics of the other components of the polymer and the catalyst used but as a rule the preferred temperature ranges will fall within the 60 to 250° C. temperature range.

The particular pressure used in any case depends upon the polymerizing characteristics of the reactants. Pressures in excess of 50 atmospheres and up to 3000 atmospheres and above may be employed although, preferably, pressures of 300 to 1500 atmospheres are employed. The upper pressure which may be employed is restricted only by the mechanical strength of commercially available equipment.

In the aqueous polymerization of ethylene, according to this invention, it is desirable to use relatively small amounts of catalytic materials. As such catalysts a wide range of polymerization-flavoring catalysts may be employed such, for example, as peroxide compounds, by which term is meant compounds which are either formed by the action of hydrogen peroxide on ordinary acids or else give rise to hydrogen peroxide on treatment with dilute sulfuric acid. These materials are per-oxy compounds, as defined in Webster's International Dictionary (1935), second edition. Examples of such compounds in addition to those specifically disclosed in the examples are persuccinic acid, lauroyl peroxide, tetralin peroxide, urea peroxide, butyryl peroxide, acetyl peroxide, acetyl benzoyl peroxide, peracetic acid, alkali metal persulfates, perborates, percarbonates, and the like. There may also be employed combinations of persulfates such as sodium or potassium persulfates, with buffering agents such as alkaline phosphates such as may be produced by adding sodium hydroxide to phosphoric acid, until a pH of about 9.0 is obtained. When employing a persulfate catalyst, it is recommended that the pH be maintained in the range of 7 to 11, this particular catalyst showing the preferred polymerization-favoring characteristics under such conditions, in the absence of dispersing agent. The amount of catalyst used may vary over a wide range but, generally speaking, it is of the order of 0.1% or more (based on the weight of the water).

In practicing this invention as a batch process, a suitable vessel is charged either with water, or with a mixture of water and an organic liquid, and a catalyst which is preferably an organic peroxide. If desired, the pH of the medium can be adjusted by addition of acid or alkali, the vessel closed, charged with ethylene to the desired pressure, agitation started, and the temperature adjusted to that at which it is desired to carry out the reaction. The pressure on the system is maintained by periodic additions of ethylene, and after the desired reaction has occurred, the reaction vessel is opened, the polymer removed, thoroughly washed, and dried.

The following examples will illustrate how the invention may be practiced.

Example 1

A stainless steel reaction vessel was charged with 150 parts of water and 0.32 parts of benzoyl peroxide. The pH was adjusted to 3.4 with dilute formic acid. The vessel was closed, evacuated, placed in an agitating rack, heated to 75° C., and pressured to 600 atmospheres with ethylene. During the reaction time of 10.75 hours the pressure was maintained at 840–985 atmospheres and the temperature at 74–78° C., throughout which the observed pressure drop totaled 1030 atmospheres.

The reaction vessel was allowed to cool, bled of excess ethylene and the contents discharged. The product was filtered, washed, and dried. There was obtained 62.5 parts of polymer melting at 119° C. and having an intrinsic viscosity of 1.91.

Example 2

Example 1 was repeated except that there was added to the reactants, 1.2 parts of the sodium salt of sulfonated white oil. The product obtained, following the description given in Example 1, amounted to 58 parts of polymer melting at 119° C. and having an intrinsic vicosity of 1.78.

It will be apparent by comparison of examples 1 and 2 that the absence of a dispersing agent gives a greater yield and improved viscosity of the final product.

Example 3

A stainless steel reaction tube was charged with 50 parts of freshly distilled vinyl acetate, 50 parts of de-aerated water, 1 part of a 50% solution of the sodium salt of sulfated 9,10-octadecenyl acetate and 0.2 parts of benzoyl peroxide. The tube was closed, evacuated to remove residual air, placed in a shaker machine and pressured to 600 atmospheres with ethylene. Heating and agitation were begun. During a reaction time of 10 hours, throughout which the temperature was maintained at 75–76° C. and the pressure at 710–990 atmospheres, the observed pressure drop totaled 670 atmospheres. The tube was cooled, bled of excess ethylene, opened and the contents discharged. Unreacted vinyl acetate was removed by steam distillation. The warm, plastic polymer mass was then separated from the residual water and washed free of dispersing agent on a smooth roll rubber mill followed by drying on the same rolls which were heated. There was thus obtained 50 parts of interpolymer having an intrinsic viscosity of 1.03.

Example 4

Example 3 was repeated except that the dispersing agent was omitted. There was obtained 60 parts of a polymer which had an intrinsic viscosity of 1.32.

By comparison of the preceding Examples 3 and 4, it will be apparent that operation in the absence of a dispersing agent results in important advantages in the production of polymers of ethylene with other polymerizable substances.

Example 5

A silver-lined steel reaction vessel was charged with 200 parts of water and 0.2 part of benzoyl peroxide, closed, agitated, and pressured with ethylene so that at a reaction temperature of 93° to 97° C. the pressure was approximately 950 atmospheres. After about an hour induction period the reaction started. The pressure was maintained between 860 and 965 atmospheres at a temperature of 93° to 97° C. by periodic additions of ethylene. During a reaction period of about 9½ hours a total pressure drop of approximately 210 atmospheres was observed. At the end of this time the reaction vessel was opened, the product removed, filtered, washed, and dried. Twelve and four tenths parts of a polymer having an intrinsic viscosity (0.5% in xylene) of 0.93, a melting point of 120° to 121° C., and a molecular weight of about 19,640 was obtained.

Example 6

A silver-lined steel reaction vessel was charged with 200 parts of water and 0.2 part of benzoyl peroxide, and the pH of the mixture adjusted to 2.4 by addition of dilute hydrochloric acid. The vessel was closed, ethylene added to a pressure of 575 atmospheres, agitated, and the temperature raised to 99° C. at which temperature the pressure in the reaction vessel increased to 970 atmospheres. During the first hour there was a total pressure drop of 180 atmospheres and during the following 9½ hours there was a 90 atmosphere additional pressure drop. Throughout the reaction the pressure was maintained between 870 and 980 atmospheres and the temperature between 99° and 110° C. At the end of this time the reaction vessel was opened, the reaction mixture filtered, the solid ethylene polymer washed thoroughly with hot water, then with methanol, and dried at 70° C. Twelve parts of polymer having an intrinsic viscosity (0.5% in xylene) of 0.90, a melting point of 118° to 120° C., and a molecular weight of 16,420 was obtained. Chips molded from the polymer were strong. Pressed films after cold rolling showed a tensile strength of 7,900 lbs./sq. in., based on the original dimensions.

Example 7

The pH of a mixture of 0.2 part of benzoyl peroxide in 200 parts of water was adjusted from 5.0 to 2.3 by addition of a few drops of dilute hydrochloric acid. The solution was charged into an aluminum lined steel reaction vessel, the vessel closed, pressured with ethylene, agitated, and reacted at 90° to 93° C. for 3 hours under 850 to 900 atmospheres pressure. The reaction started immediately, without induction period. The product thus obtained was found to have an intrinsic viscosity (0.5% in xylene) of 0.95, which corresponds to a molecular weight of 20,200.

The melting point of the polymer was 116° to 117° C.

Example 8

A silver-lined steel reaction vessel was charged with 160 parts of water, 40 parts of isooctane, and 0.8 parts of benzoyl peroxide. The pH of the mixture was adjusted from 5.0 to 2.1 by addition of dilute hydrochloric acid. The reaction vessel was closed, agitated, and pressured with ethylene so that at a reaction temperature of about 95° C. the pressure was 990 atmospheres. There was less than 30 minutes induction period and during a reaction period of 4 hours there was a total pressure drop of approximately 475 atmospheres. There was obtained 29 parts of polymer having a melting point of 117° to 118° C., and a melt viscosity at 139° C. of 2,700 poises.

Example 9

An aluminum-lined steel reaction vessel was charged with 175 parts of water and 0.4 parts of benzoyl peroxide. The pH of the solution was adjusted from 4.1 to 2.1 by addition of dilute hydrochloric acid, the vessel closed, and 24 parts of propylene introduced. The reaction vessel was pressured with ethylene to a pressure of 600 atmospheres, agitated, and heated to 87° C. The reaction started immediately, without induction period and during a reaction time of 10 hours there was a total pressure drop of 260 atmospheres. Throughout this time the temperature was maintained at 87° to 88° C. and the pressure at 870 to 965 atmospheres by periodic addition of ethylene. The product obtained after washing and drying at 70° C. melted at 80° to 82° C. and had a melt viscosity at 139° C. of 21.5 poises. The yield was 13.7 parts.

Example 10

An aluminum-lined reaction vessel is charged with 80 parts of water, 20 parts of methyl methacrylate, and 0.4 parts of benzoyl peroxide. The pH of this mixture is adjusted to 3.3 by the addition of hydrochloric acid. The vessel is closed, placed in a shaker machine, pressured with ethylene, and heating and agitation started. In a reaction time of 10.25 hours, during which the temperature is maintained at 94° to 95° C. and the pressure at 870 to 980 atmospheres, the observed pressure drop totals 260 atmospheres. The vessel is allowed to cool, bled of excess ethylene, opened, and the contents discharged. The reaction mixture is steam distilled to remove unreacted methyl methacrylate, the residue filtered, rinsed with methanol, and dried at 70° C. There is thus obtained 29 parts of an interpolymer which softens below 100° C. and which contains 70.2% carbon and 10.5% hydrogen, and which has an intrinsic viscosity of 0.61 (measured as a 0.125% solution in xylene). From the above analysis it may be calculated that the interpolymer has a mole ratio of methyl methacrylate to ethylene of 1 to 2.5.

Example 11

An aluminum-lined steel reaction vessel is charged with 140 parts of water and 0.4 parts of benzoyl peroxide. The pH of the mixture is adjusted to 3.3 with dilute formic acid. The vessel is closed, evacuated, and 50 parts of vinyl chloride added by expansion from a storage cylinder. The vessel is then placed in a shaker machine, pressured with ethylene, and heating and agitation started. During a reaction time of 10.25 hours, during which the temperature is maintained at 69° to 71° C. and the pressure at 825 to 950 atmospheres the observed pressure drop totals 950 atmospheres. The vessel is allowed to cool, bled of excess gases, opened, and the contents discharged. The contents of the reaction vessel are steam distilled to remove unreacted vinyl chloride, the product separated from residual water, and dried by milling in a rubber mill. There is thus obtained 46 parts of a product which has an intrinsic viscosity of 0.69 and which contains 30.3% chlorine. From this analysis it may be calculated that the interpolymer has a mole ratio of vinyl chloride to ethylene of 1 to 1.9. The interpolymer is tough and has a very low solubility in the common organic solvents.

Example 12

A stainless steel reaction vessel was charged with 20 parts of methyl methacrylate, 80 parts of deaerated water, 1.0 part of borax and 0.2 part of sodium persulfate. The pH of this charge was 9.2. The vessel was closed, evacuated to remove residual air, placed in the shaker machine and suitable service connections established. Heating and agitation were started and during a reaction time of 10.25 hours, throughout which the temperature was maintained at 74 to 75° C. and the pressure at 860 to 960 atmospheres, the total observed pressure drop was 170 atmospheres. The vessel was cooled, bled of excess ethylene, opened and the reaction mixture discharged. This had a pH of 8.5. The polymer was separated from monomer by steam distillation of the latter. The polymer was then filtered from water and dried. There was thus obtained 14.3 parts of a methyl methacrylate/ethylene interpolymer whose analysis (68.9% C, 9.6% H) showed a methyl methacrylate/ethylene mole ratio of 1:1.9. This could be pressed to clear tough films which had good cold drawing properties.

Although the examples illustrating polymerization of ethylene with other polymerizable materials have been restricted to polymers of ethylene with propylene, methyl methacrylate, vinyl chloride and acetate, nevertheless, it should be understood that the processes of this invention may be employed also in polymerizing ethylene with other polymerizable substances. Thus, for example, ethylene may be polymerized, according to this invention with: other mono-olefines, e. g. amylene, butylene; dichloroethylenes, e. g. 1,2-dichloroethylene, 2-chloropropene-1; tetrafluoroethylene; dienes, e. g. butadiene, isoprene, chloro-2-butadiene-1,3; terpenes, e. g., limonene, camphene; vinyl ethers, ketones and esters, and other vinyl compounds, such as methyl and propyl vinyl ethers, methyl and ethyl vinyl ketones, vinyl chloroacetate, vinyl propionate, N-vinylphthalimide, vinyl thiol acetate, methyl vinyl thio ether, sulfone, vinyl sulfonic esters, vinyl carbazole; stilbene; styrene and methyl styrene; acrylic and methacrylic acids and their amides, nitriles, and esters and other acrylic and methacrylic compounds, such as the methyl, ethyl, and propyl acrylates and methacrylates, methylene diacrylate and dimethacrylate; alphahaloacrylic acids and esters, e. g. methyl alpha-chloroacrylate; esters of crotonic acid, e. g. methyl crotonate; esters of itaconic acid, e. g. diethyl itaconate.

By the process of this invention co-polymers can also be made, by which term is meant the products obtainable by the polymerization of ethylene with one or more polymeric materials resulting from the polymerization of organic compounds of the above-mentioned types.

The term polymer as used in the claims refers to products obtainable by polymerizing ethylene alone or admixed with one or more of other polymerizable organic compounds.

Although in the examples hydrochloric acid has been used in adjusting the pH of the medium to the desired value, other acids, such as sulfuric, phosphoric, formic, acetic, propionic, etc. may be used. In the case of interpolymers, the particular pH at which the reaction is carried out depends to a large extent upon the nature of the catalyst used and of the other component or components of the interpolymer, and in some cases it may be desirable to operate on the alkaline side.

In commercial practice a continuous process offers advantages of efficiency, more accurate control and, especially in the case of polymers involving ethylene together with other polymerizable materials, better possibilities for adjusting the ratio of polymerizing ingredients. For most efficient operation in a continuous process a rapid rate of reaction is necessary.

The essential conditions used in the continuous operation, technique of agitation, control of pH, isolation of finished products, and recirculation of unreacted materials may be varied widely. For example, ethylene under pressure may be continuously introduced into water containing a polymerization-favoring catalyst such as a peroxide and the resulting mixture maintained in a turbulent state, passed under pressure through a reactor in which the time of contact and temperature are controlled to effect the required degree of polymerization. The resulting content of the reaction vessel may be passed into an area of lower pressure to recover unreacted ethylene and the polymer may be isolated by filtration. When polymerizing ethylene with a liquid unsaturated compound the latter can be introduced continuously as a component of the water phase. When it is desired to polymerize continuously two unsaturated gases, both having critical temperatures below the operating temperature, e. g. ethylene and tetrafluoroethylene, the gases may be premixed in the desired proportions and brought into contact with the water phase under pressure or the gases may be injected separately into the water phase in the desired proportions.

For rapid polymerization it is necessary to provide intimate contact between all the reactants by agitation. By the term agitation as used herein it is intended to include any means for accomplishing intimate contact between the reactants, e. g. rapid stirring, turbulence in a continuous flow process, atomization, shaking, or efficient bubbling of the gas or gases through the water phase.

In practice it is desirable to use equipment fabricated of, or lined with, material which will not catalyze too rapidly the decomposition of peroxides to molecular oxygen. Examples of such lining materials are silver, aluminum, tin, glass, and stainless steels.

The invention presents several valuable technical and practical advantages as will be apparent from the following facts:

In view of the highly exothermic nature of the ethylene polymerization reaction it is necessary to remove the heat of reaction as rapidly as possible if the reaction is to be kept under control. The process of this invention, by permitting the ready removal of heat of reaction, makes it possible to exercise accurate control of the reaction without the necessity of having to provide special means for dissipating the heat of reaction. Accordingly, the greater ease of control of the reaction makes the present process more readily adaptable to large-scale operation and hence more practical than the prior art methods.

In the preparation of polymers of ethylene with other polymerizable materials, the process of this invention is particularly advantageous not only with respect to breadth of applicability but also with respect to uniformity of the products and ease of operation. Thus by the process of this invention polymers of ethylene with other materials can be made which are not readily prepared by the prior art methods, because under the operating conditions of the prior art, intimate contact of the ethylene and the other component or components of the polymer is not obtained.

The term "aqueous medium" has been employed to describe the water-medium in which polymerization is carried on, because mixtures of other substances with the water may be employed if desired. Advantages may be found in certain circumstances in operating with mixtures of water with other liquids such as isooctane, toluene, n-hexane, cyclohexane, m-bromtoluene, petroleum ether, gasoline, and the like, but it is generally preferred, because of possible sacrifice in yield when using such mixtures, to employ water alone as the "aqueous medium" in which polymerization is effected.

The intrinsic viscosities referred to herein are obtained by calculation of the following equation:

$$[\eta] = \frac{ln \; \eta rel.}{C}$$

where $[\eta]$ = intrinsic viscosity, $$\eta \; rel. = \frac{\eta \; solution}{\eta \; solvent}$$

C = concentration in grams per 100 cc., and $ln$ is the natural or Naperian logarithm. (Staudinger, Zeitsch, Phys. Chem. 171, 129 (1934).)

The molecular weights referred to above are calculated from the following equation:

$$M = \frac{\eta \; rel.^{-1}}{(C/1.4 \times 0.85 \times 10^{-4}}$$

where M = molecular weight;

$$\eta \; rel. = \frac{\eta \; solution}{\eta \; solvent}$$

C = concentration in grams per 100 cc.; and 1.4 and $0.85 \times 10^{-4}$ are constants for linear hydrocarbon polymers. Viscosities are measured in an Ostwald pipette at 86° C. and since relative viscosity is the only viscosity figure used, this is really $$rel. = \frac{\text{Time of efflux of solution}}{\text{Time of efflux of solvent}}$$

the factor for conversion to absolute viscosity cancelling out.

Various changes may be made in the details and specific embodiments of this invention described herein without departing therefrom or sacrificing any of the advantages of the invention.

I claim:

1. In a process for polymerizing ethylene the step which comprises carrying out the polymerization in an aqueous medium, in the presence of an organic peroxide catalyst and in the absence of a dispersing agent, at a pressure above 300 atmospheres, and at a temperature in the range of from 50 to 250° C.

2. In a process for polymerizing ethylene the step which comprises carrying out the polymerization in an aqueous medium, in the presence of benzoyl peroxide catalyst and in the absence of a dispersing agent, at a pressure above 300 atmospheres, and at a temperature in the range of 20 to 350° C.

3. In a process for the preparation of products of ethylene selected from the group consisting of polymers of ethylene and interpolymers of ethylene with another polymerizable organic compound containing ethylenic unsaturation, in the presence of a peroxy compound catalyst, under temperatures between 20 and 350° C. and under pressures above 300 atmospheres, the step which comprises carrying out the polymerization in an aqueous medium and in the absence of a dispersing agent.

4. In a process for the preparation of products of ethylene selected from the group consisting of polymers of ethylene and interpolymers of ethylene with another polymerizable organic compound containing ethylenic unsaturation, in the presence of a peroxy compound catalyst, under temperatures between 20 and 350° C. and under pressures above 300 atmospheres, the step which comprises carrying out the polymerization in a deaerated aqueous medium and in the absence of a dispersion agent.

5. In a process for the preparation of products of ethylene selected from the group consisting of polymers of ethylene and interpolymers of ethylene with another polymerizable organic compound containing ethylenic unsaturation, in the presence of a peroxy compound catalyst, under temperatures between 20 and 350° C. and under pressures above 300 atmospheres, the step which comprises carrying out the polymerization in the absence of a dispersing agent and in an aqueous medium containing a volatile liquid organic compound selected from the group consisting of isooctane, toluene, normal hexane, cyclohexane, petroleum ether and gasoline.

6. In a process for the preparation of interpolymers of ethylene with another polymerizable organic compound containing ethylenic unsaturation in the presence of a peroxy catalyst, under temperatures between 20 and 350° C. and under pressure above 50 atmospheres, the step which comprises carrying out the polymerization in an aqueous medium and in the absence of a dispersing agent.

7. In a process for the preparation of an interpolymer of ethylene with vinyl acetate in the presence of a peroxy catalyst, under temperatures between 20 and 350° C. and under pressures above 50 atmospheres, the step which comprises carrying out the polymerization in an aqueous medium and in the absence of a dispersing agent.

8. In a process for the preparation of an interpolymer of ethylene with vinyl chloride in the presence of a peroxy catalyst, under temperatures between 20 and 350° C. and under pressures above 50 atmospheres, the step which comprises carrying out the polymerization in an aqueous medium and in the absence of a dispersing agent.

MERLIN MARTIN BRUBAKER.